United States Patent
Takagi et al.

(10) Patent No.: US 9,316,526 B2
(45) Date of Patent: Apr. 19, 2016

(54) SLIDING LIQUID LEVEL SENSOR

(71) Applicants: AISAN KOGYO KABUSHIKI KAISHA, Obu-shi, Aichi-ken (JP); Hyundam Ind. Co., Ltd., Asan-shi Chung Cheong Nam-Do (KR)

(72) Inventors: Kunio Takagi, Aichi-ken (JP); Jin Wook Jang, Asan-shi (KR); Hoon Pyo Kwak, Asan-shi (KR)

(73) Assignees: AISAN KOGYO KABUSHIKI KAISHA, Obu-Shi, Aichi-Ken (JP); HYUNDAM IND. CO., LTD, Asan-Shi Chung Cheong Nam-Do (KR)

( * ) Notice: Subject to any disclaimer, the term of this patent is extended or adjusted under 35 U.S.C. 154(b) by 263 days.

(21) Appl. No.: 13/797,854

(22) Filed: Mar. 12, 2013

(65) Prior Publication Data

US 2013/0239677 A1    Sep. 19, 2013

(30) Foreign Application Priority Data

Mar. 14, 2012   (JP) .................................. 2012-057325

(51) Int. Cl.
   *G01F 23/60* (2006.01)
   *G01F 23/36* (2006.01)

(52) U.S. Cl.
   CPC .............. *G01F 23/60* (2013.01); *G01F 23/363* (2013.01)

(58) Field of Classification Search
   USPC .......................................................... 73/317
   See application file for complete search history.

(56) References Cited

U.S. PATENT DOCUMENTS

| 6,389,892 | B1 * | 5/2002 | Sato .................. G01F 23/363 73/290 R |
| 6,518,873 | B1 * | 2/2003 | O'Regan et al. .............. 338/190 |
| 6,571,627 | B2 | 6/2003 | Yasuda et al. |
| 6,681,628 | B2 | 1/2004 | Sawert et al. |
| 7,752,912 | B2 * | 7/2010 | Nagakura et al. ............... 73/317 |
| 2007/0163341 | A1 | 7/2007 | Nagakura et al. |

FOREIGN PATENT DOCUMENTS

| CA | 2460239 A1 | 3/2003 |
| DE | 10152029 A1 | 7/2002 |

(Continued)

OTHER PUBLICATIONS

Notice of Grounds for Rejection dated Feb. 28, 2014 for Korean Patent Application No. 2013-0025836 (6 pages).

(Continued)

*Primary Examiner* — Hezron E Williams
*Assistant Examiner* — Mark A Shabman
(74) *Attorney, Agent, or Firm* — Conley Rose, P.C.

(57) ABSTRACT

Embodiments of the invention are directed towards a sliding liquid level sensor which is mounted in a fuel tank of a vehicle for detecting a remaining amount of a liquid fuel in the tank. The liquid level sensor has a float, a plurality of electrodes, and a sliding contact point configured to slide on the electrodes in accordance with a displacement of the float. The electrodes preferably contain 100 parts by weight of a silver-palladium alloy and preferably 3-20 parts by weight of glass. The silver-palladium alloy preferably contains 20-60% by weight of silver and preferably 80-40% by weight of palladium. The sliding contact point is made from a palladium-nickel alloy that preferably contains 70-90% by weight of palladium and preferably 30-10% by weight of nickel.

4 Claims, 2 Drawing Sheets

(56) References Cited

FOREIGN PATENT DOCUMENTS

| | | |
|---|---|---|
| JP | 2000-136956 A | 5/2000 |
| JP | 2001-342593 A | 12/2001 |
| JP | 2003-287455 A | 10/2003 |
| JP | 2005-503012 A | 1/2005 |
| JP | 2005503012 A | 1/2005 |
| JP | 2007187633 | 7/2007 |
| WO | 03023793 A1 | 3/2003 |

OTHER PUBLICATIONS

German Patent Application No. DE 10 2013 004 398.0 Office Action dated Mar. 26, 2015 (7 pages).

Japanese Patent Application No. 2012-057325 Notification of Reasons for Rejection dated Jan. 5, 2016 (4 pages)

* cited by examiner

SLIDING LIQUID LEVEL SENSOR

This application claims priority to Japanese patent application serial number 2012-057325, the contents of which are incorporated herein by reference.

BACKGROUND OF THE INVENTION

This disclosure relates to a liquid level sensor for detecting a remaining amount of a liquid fuel in a fuel tank mounted on a vehicle. In particular, it relates to a sliding liquid level sensor having a contact point sliding over a plurality of electrodes in accordance with the movement of a float.

In conventional sliding liquid level sensors, silver often serves as major component in alloys, such as silver-palladium alloy or silver-nickel alloy. They are typically used for a sliding contact point and electrodes. Silver has low electrical resistance and thus has good conductivity. Silver, however, can get corroded through contact with a liquid fuel component such as those containing sulfur, water or alcohol. Such deterioration or corrosion can cause the connection to become loose. In particular, silver easily reacts with sulfur, thereby forming a silver sulfide membrane on surfaces of the sliding contact point and the electrodes. Since silver sulfide is an insulator, the silver sulfide membrane causes a loose connection, resulting in an eventual decrease in detection accuracy.

Disclosure of Japanese Laid-Open Patent Publication No. 2007-187633 tends to solve such a problem. In Japanese Laid-Open Patent Publication No. 2007-187633, electrodes are made from a silver-palladium alloy with glass and the contact point is made from a copper-nickel alloy. The electrodes contain 30-50 parts by weight of glass per 100 parts by weight of the silver-palladium alloy, and their silver/palladium ratio by weight is between 70/30 and 60/40. Copper/nickel ratio by weight of the copper-nickel alloy is 70/30, and the copper-nickel alloy has Vickers hardness between 190 and 250.

In Japanese Laid-Open Patent Publication No. 2007-187633, a large amount of glass is used for the electrodes, and silver is not used for the contact point in order to prevent loosening of the connection via formation of silver sulfide, etc. However, since the electrodes contain silver as a major component, it is not able to effectively prevent silver sulfide formation. In addition, the large amount of glass makes the electrodes too hard, so that it is necessary to harden the contact point in accordance with the hardness of the electrodes. Since silver cannot be used for the electrode, the contact point is made from the copper-nickel alloy having such the required level of hardness. However, copper, like silver is easily sulfurized or oxidized when coming in contact with a liquid fuel. Therefore, there has been need for improved sliding liquid level sensors.

BRIEF SUMMARY OF THE INVENTION

In one aspect of this disclosure, is provided a sliding liquid level sensor which is mounted to a fuel tank of a vehicle for detecting a remaining amount of a liquid fuel in the tank. The liquid level sensor has a float, a plurality of electrodes, and a sliding contact point configured to slide over the electrodes in accordance with displacement of the float. The electrodes preferably contain 100 parts by weight of a silver-palladium alloy and 3-20 parts by weight of glass. The silver-palladium alloy contains 20-60% by weight of silver and 80-40% by weight of palladium. The sliding contact point is preferably made from a palladium-nickel alloy that contains 70-90% by weight of palladium and 30-10% by weight of nickel.

According to this aspect, the electrodes contain silver less than the conventional sensor, so that it is able to suppress formation of silver sulfide. In addition, the electrodes contain a predetermined amount of silver in order to keep good conductivity. Since the electrodes contain an amount of silver less than the conventional sensor, the amount of glass added to the electrodes also can be decreased. This prevents the electrodes from being excessively hard. The electrodes include the proper quantity of glass such that the electrodes have higher hardness than the sliding contact point. Accordingly, it is possible to suppress abrasion of the electrodes caused by sliding contact between the electrodes and the sliding contact point.

The sliding contact point does not include silver nor copper which are easily oxidized or sulfurized through contact with liquid fuel. In this way, loosening between the sliding contact point and the electrodes can be reduced. A sliding contact point having palladium as its major component results in a sliding contact point with a reduced hardness. Further, the proper quantity of nickel provides the sliding contact point with sufficient hardness. In this way, abrasion caused by sliding between the electrodes and the sliding contact point can be reduced. Further, nickel is not expensive, so that manufacturing cost for the liquid level sensor can be decreased.

DETAILED DESCRIPTION OF THE INVENTION

Each of the additional features and teachings disclosed above and below may be utilized separately or in conjunction with other features and teachings to provide improved sliding liquid level sensors. Representative examples of the present invention, which examples utilized many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
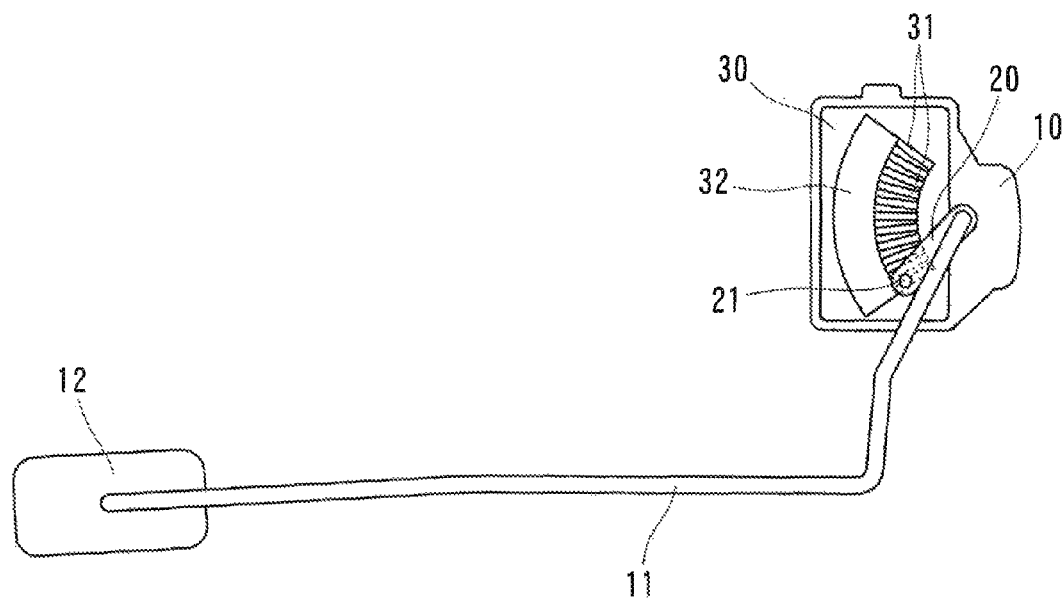
FIG. 1 is a front view of a sliding liquid level sensor.
Figure 2:
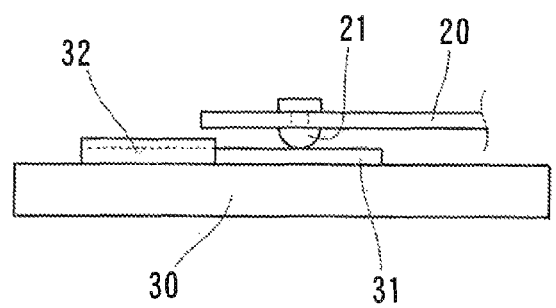
FIG. 2 is an enlarged bottom view showing a part of the sliding liquid level sensor.

A sliding liquid level sensor of an embodiment may be mounted to a fuel tank for a vehicle such as car, motorcycle, bus or truck for detecting a remaining amount of a liquid feel in the fuel tank, such as gasoline or light oil. As shown in FIGS. 1 and 2, the sliding liquid level sensor has a support plate 10 serving as an installation bracket, an arm 11 that is formed into a rod shape and is pivotably mounted on the support plate 10. It also has a float 12 attached to an end of the arm 11, a slider 20 pivoting integrally with the arm 11 and a sliding contact point 21 provided on an end of the slider 20, a board 30 fixed on the support plate 10. A plurality of electrodes 31 are preferably radially arranged on a surface of the board 30 in an arc-shape and each having an inner end near a pivot point of the arm 11 and the slider 20. They preferably each have an outer end opposite to the inner end. A resistor 32 formed in a band shape preferably covers the outer ends of the electrodes 31.

The float 12 is configured to float on the surface of the liquid fuel. When the float 12 moves in a vertical direction in accordance with the remaining amount of the liquid fuel, the arm 11 pivots in conjunction with the displacement of the float 12. The slider 20 is formed to pivot concentrically and integrally with the arm 11. Accordingly, the sliding contact point 21 provided on the end of the slider 20 moves in conjunction with the displacement of the float 12. The sliding contact point 21 is fixed on the slider 20 by, e.g., swaging or welding.

The board 30 is made from a ceramic material having an insulation property. The electrodes 31 and the resistor 32 are printed on a surface of the board 30. In detail, a material for the electrodes 31 or the resistor 32 is mixed with a solvent and is formed into a paste. The paste is printed on the board 30 in a predetermined pattern by screen-printing or the like, and then is dried and heated.

The electrodes 31 are preferably made from a silver (Ag)-palladium (Pd) alloy with glass. The amount of silver contained in the Ag—Pd alloy is preferably 20-60% by weight, and the amount of palladium contained in the Ag—Pd alloy preferably is 80-40% by weight. Here, the total amount of Ag and Pd is preferably 100% by weight. When the amount of silver is below 20% by weight (the amount of palladium is above 80% by weight), it is not possible to ensure good conductivity of the electrodes 31. In addition, the electrodes 31 are heated to about 850° C. during production, and in a temperature elevating process thereto, in particular between 300-800° C., palladium is easily oxidized to form palladium oxide (PdO and $PdO_2$). The palladium oxide generated in the temperature range usually disappear above 800° C., however when there is too much palladium oxide, there is a risk that the palladium oxide remain in the electrodes 31 and make conductivity of the electrodes 31 lower. On the other hand, when the amount of silver is above 60% by weight (the amount of palladium is below 40% by weight), the electrodes 31 contain a large amount of silver in the same manner with the conventional electrode, and it is not possible to sufficiently suppress formation of silver sulfide.

In addition, the electrodes 31 preferably contain 3-20 parts by weight of glass per 100 parts by weight of the Ag—Pd alloy. Glass added to thereto prevents abrasion of the electrodes 31 regardless of composition of the Ag—Pd alloy. When the amount of glass is below 3 parts by weight, it is not possible to prevent abrasion of the electrodes 31 sufficiently. On the other hand, when the amount of glass is above 20 parts by weight, hardness of the electrodes 31 becomes much higher, thereby increasing friction damage of the sliding contact point 21. Here, although the type and the composition of glass used for the electrodes 31 are not specifically limited, bismuth oxide or silicon based glass and borosilicate glass are preferable in view of production cost and widely available.

The electrodes 31 having the above-mentioned composition effectively prevent formation of silver sulfide and can achieve good conductivity. The electrodes 31 have conductive resistance of about 120-150 mΩ/10 μm. Further, the electrodes 31 contain a moderate amount of glass and thus have adequate hardness. The hardness of the electrodes 31 is higher than that of the sliding contact point 21, so that it is possible to prevent abrasion of the electrodes 31 caused by friction between the electrodes 31 and the sliding contact point 21.

The sliding contact point 21 is made from a palladium (Pd)-nickel (Ni) alloy. The amount of palladium contained in the Pd—Ni alloy is preferably 70-90% by weight, and the amount of nickel contained in the Pd—Ni alloy is preferably 30-10% by weight. Here, the total amount of palladium and nickel is preferably 100% by weight. The sliding contact point 21 includes no silver that is easily sulfurized or oxidized, thereby preventing formation of silver sulfide. Nickel is added to the sliding contact point 21 in order to achieve adequate hardness of the sliding contact point 21. Thus, when the amount of nickel is below 10% by weight (the amount of palladium is above 90% by weight), the hardness of the sliding contact point 21 becomes much lower, thereby increasing abrasion of the sliding contact point 21 caused by friction between the sliding contact point 21 and the electrodes 31. On the other hand, when the amount of nickel is above 30% by weight (the amount of palladium is below 70% by weight), the hardness of the sliding contact point 21 becomes much higher, thereby increasing abrasion of the electrodes 31 caused by friction between the electrodes 31 and the sliding contact point 21.

The compositions of the electrodes 31 and the sliding contact point 21 are determined as described above such that the hardness of the electrodes 31 is higher than that of the sliding contact point 21. This intends to preferentially abrade the sliding contact point 21 formed in a protrusion shape and having a predetermined thickness compared with the electrodes 31 formed in a printed thin membrane shape when the sliding contact point 21 slides over the electrodes 31. This can maintain the function of the sensor for a longer period of time. The resistance of the siding contact point 21 is about 8-10 μΩcm, and its Vickers hardness is about 235-295 Hv.

The sliding liquid level sensor of this embodiment can be located on a ceiling wall or a sidewall of the fuel tank and can be mounted on a casing of a fuel pump unit. The fuel pump may have various components such as a fuel pump, a fuel filter and a pressure regulator. It may be integrated into a module located on a bottom surface of the fuel tank.

When the amount of the liquid fuel stored in the fuel tank increases or decreases, the fluid level of the liquid fuel changes in a vertical direction. At that time, the float 12 floating on the fluid level is displaced up or down according to the change of the fluid level. Due to this displacement, the arm 11 supporting the float 12 pivots, so that the slider 20 pivots concentrically and integrally with the arm 11. As a result, the sliding contact point 21 attached to the end of the slider 20 slides on the electrodes 31. Since resistance value changes depending on the position of the electrode 31 that the sliding contact point 21 is contacting, the amount of the liquid fuel in the fuel tank is detected based on the resistance value and is shown on an indicator (not shown). The electrodes 31 are connected with conductive members such as lead (not shown) such that detection signals are output from the sliding liquid level sensor toward a measuring instrument via the conductive members.

Other embodiment examples will be further described below.

Example 1

A plurality of electrodes each formed in a strip shape were printed on an alumina plate by a screen printing method, and then were dried and heated. The heating step was carried out at 850° C. for 10 min. The electrodes contained 25% by weight of silver and 75% by weight of palladium and further contained 3.4 parts by weight of glass per 100 parts of combination of silver and palladium. Each of the electrodes was shaped such that its width was about 0.2 mm and its length was about 5 mm, and about 50 electrodes were radially arranged in an arc-shape. Then, a resistor mainly containing ruthenium oxide and glass was formed in a band shape contacting with outer ends of the electrodes through a printing step and a heating step. In addition, a sliding contact point containing 80% by weight of palladium and 20% by weight of nickel was formed to have the thickness of 0.2 mm and was attached to a base made from copper nickel by welding such that the sliding contact point was positioned to contact with the electrodes.

Figure 3:
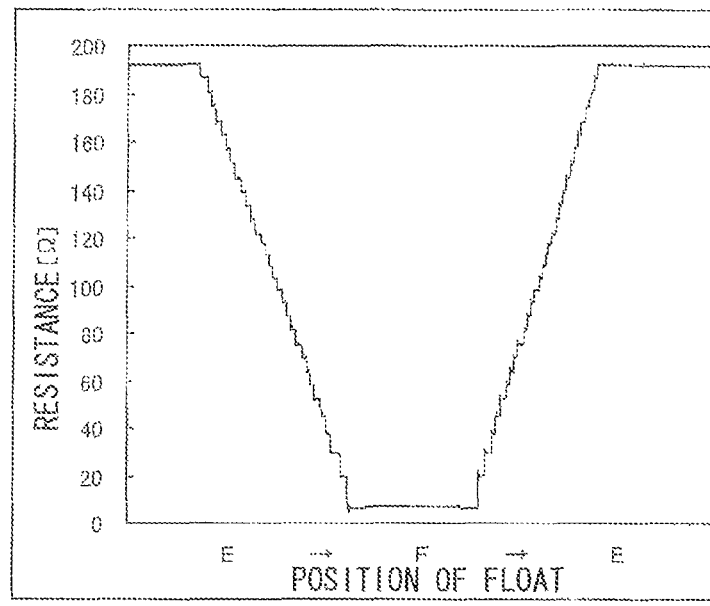
FIG. 3 is a graph showing an output wavelength of resistance in Example 1.

The electrodes and the sliding contact point was applied to a sliding liquid level sensor, and then the sliding liquid level sensor was operated in a liquid fuel containing 30 ppm of sulfur component at 1.4 million times. FIG. 3 shows an output wavelength during this operation. As shown in FIG. 3, the output wavelength shows a stepped pattern and does not include any noise pattern. As a result of measuring abrasion depths, the abrasion depth of the electrodes was 4 μm, and the abrasion depth of the sliding contact point was 70 μm.

Example 2

Comparative Example

A plurality of electrodes each formed in a strip shape were printed on an alumina plate by the screen printing method, and then were dried and heated. The healing step was earned out at 850° C. for 10 min. The electrodes contained 45% by weight of silver and 55% by weight of palladium and further contained 3.4 parts by weight of glass per 100 parts by weight of combination of silver and palladium. Each of the electrodes was shaped such that its width was about 0.2 mm and its length was about 5 mm, and about 50 electrodes were radially arranged in an arc-shape. Then, a resistor mainly containing ruthenium oxide and glass was formed in a hand shape contacting with outer ends of the electrodes through a printing step and a heating step. In addition, a sliding contact point containing 100% by weight of palladium was formed to have the thickness of 0.2 mm and was attached to a base made from copper nickel by welding such mat the sliding contact point was positioned to contact with the electrodes.

Figure 4:
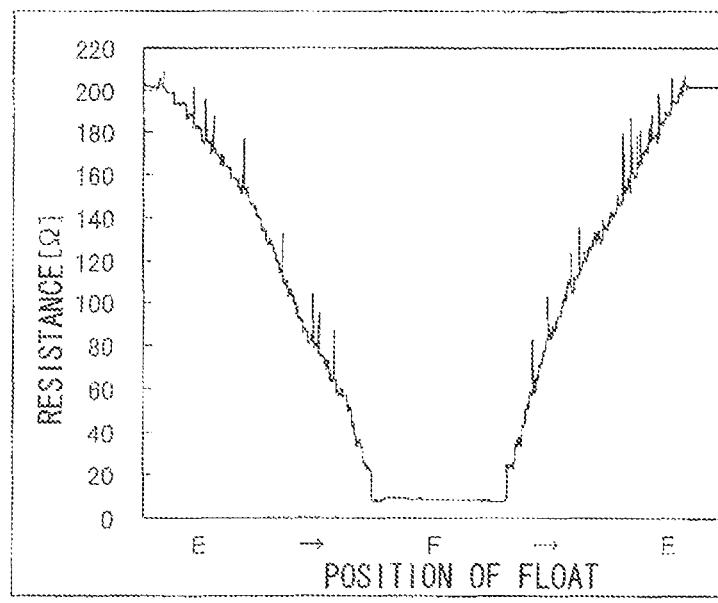
FIG. 4 is a graph showing an output wavelength of resistance in Example 2.

The electrodes and the sliding contact point was applied to a sliding liquid level sensor, and then the sliding liquid level sensor was operated in a liquid fuel containing 30 ppm of sulfur component at 1.4 million times. FIG. 4 shows an output wavelength during this operation. As a result of measuring abrasion depths, the abrasion depth of the electrodes was 2 μm and was lower than that of Example 1. On the other hand, the abrasion depth of the sliding contact point was 0.36 mm and was much higher than that of Example 1 such that the sliding contact point was completely worn out.

In Examples 1 and 2, a liquid fuel containing 30 ppm of sulfur component was used. Concentration of the sulfur component in a liquid fuel for a motor vehicle is strictly regulated, so that commercially available liquid fuel usually contains low-concentrated sulfur component, such as 30 ppm.

The invention claimed is:

1. A sliding liquid level sensor which is mounted in a fuel tank of a vehicle and detects a remaining amount of a liquid fuel in the tank, the sliding liquid level sensor comprising:
 a float;
 a plurality of electrodes containing 100 parts by weight of a silver-palladium alloy and 3-20 parts by weight of glass, wherein the silver-palladium alloy contains 20-45% by weight of silver and 80-55% by weight of palladium; and
 a sliding contact point configured to slide over the electrodes in accordance with displacement of the float, wherein the sliding contact point is made from a palladium-nickel alloy that contains 70-90% by weight of palladium and 30-10% by weight of nickel.

2. The sliding liquid level sensor of claim 1 wherein the sliver-palladium alloy contains 20-30% by weight of silver and 80-70% by weight of palladium.

3. The sliding liquid level sensor of claim 1 wherein the palladium-nickel alloy contains 75-85% by weight of palladium and 25-15% by weight of nickel.

4. The sliding liquid level sensor of claim 1 wherein the plurality of electrodes are comprised of glass composed of either bismuth oxide based glass, silicon based glass or borosilicate glass.

* * * * *